United States Patent
Kerselaers et al.

(10) Patent No.: US 10,944,447 B1
(45) Date of Patent: Mar. 9, 2021

(54) MULTI-CHANNEL NEAR-FIELD ELECTROMAGNETIC INDUCTION DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/701,543

(22) Filed: Dec. 3, 2019

(51) Int. Cl.
*H04B 5/00* (2006.01)
*H04B 17/336* (2015.01)
*H04W 4/80* (2018.01)
*H04W 72/08* (2009.01)

(52) U.S. Cl.
CPC ......... *H04B 5/0081* (2013.01); *H04B 5/0006* (2013.01); *H04B 17/336* (2015.01); *H04W 4/80* (2018.02); *H04W 72/082* (2013.01)

(58) Field of Classification Search
CPC .. H04B 5/0081; H04B 5/0006; H04B 17/336; H04W 72/082; H04W 4/80
USPC ........................................................ 455/41.1
See application file for complete search history.

(56) References Cited

U.S. PATENT DOCUMENTS

| 8,165,236 | B2 | 4/2012 | Hyoung et al. | |
|---|---|---|---|---|
| 9,197,986 | B1 | 11/2015 | Kerselaers et al. | |
| 10,277,334 | B2 | 4/2019 | Yoo et al. | |
| 2006/0235633 | A1* | 10/2006 | Simons | G01R 29/0892 702/65 |
| 2009/0079656 | A1* | 3/2009 | Peyla | H01Q 1/46 343/860 |
| 2013/0293354 | A1* | 11/2013 | Vemagiri | G06K 19/0723 340/10.1 |
| 2016/0261306 | A1* | 9/2016 | Seller | H04W 56/0015 |
| 2018/0248647 | A1* | 8/2018 | Di Taranto | H04L 1/0009 |

* cited by examiner

*Primary Examiner* — Eugene Yun

(57) ABSTRACT

One example discloses a multi-channel near-field electromagnetic induction (NFEMI) device, including: a sub-channel controller configured to be coupled to a near-field magnetic antenna (H-field) and a near-field electric antenna (E-field) and configured to receive a message to be transmitted to a second near-field device in a near-field body-network through the near-field electric and magnetic antennas; wherein the sub-channel controller is configured to divide a narrow-band near-field channel into a set of sub-channels; and wherein the sub-channel controller is configured to calculate a signal-to-noise-ratio (SNR) for each sub-channel and select a sub-channel, from the set of sub-channels, for transmission of the message that has a higher SNR than another sub-channel in the set of sub-channels.

24 Claims, 6 Drawing Sheets

MULTI-CHANNEL NEAR-FIELD ELECTROMAGNETIC INDUCTION DEVICE

The present specification relates to systems, methods, apparatuses, devices, articles of manufacture and instructions for near-field electromagnetic induction devices.

SUMMARY

According to an example embodiment, a multi-channel near-field electromagnetic induction (NFEMI) device, comprising: a sub-channel controller configured to be coupled to a near-field magnetic antenna (H-field) and a near-field electric antenna (E-field) and configured to receive a message to be transmitted to a second near-field device in a near-field body-network through the near-field electric and magnetic antennas; wherein the sub-channel controller is configured to divide a narrow-band near-field channel into a set of sub-channels; and wherein the sub-channel controller is configured to calculate a signal-to-noise-ratio (SNR) for each sub-channel and select a sub-channel, from the set of sub-channels, for transmission of the message that has a higher SNR than another sub-channel in the set of sub-channels.

In another example embodiment, the sub-channel controller is configured to adjust a ratio of an E-field generated by the near-field electric antenna and an H-field generated by the near-field magnetic antenna, for transmission of the message to the second near-field device, based on the SNR.

In another example embodiment, the sub-channel controller is configured to select a modulation protocol for transmission of the message to the second near-field device, based on the SNR.

In another example embodiment, the sub-channel controller is configured to select a sub-channel, from the set of sub-channels, for transmission of the message that has a highest SNR than any other sub-channel in the set of sub-channels.

In another example embodiment, the sub-channel controller is configured to divide the message into a set of sub-messages; and the sub-channel controller is configured to transmit all the sub-messages serially on the sub-channel having the highest SNR.

In another example embodiment, the sub-channel controller is configured to divide the message into a set of sub-messages based on the SNR for each sub-channel; and the sub-channel controller is configured to match the sub-messages to the sub-channels such that the second near-field device receives all the sub-messages at substantially a same time.

In another example embodiment, the sub-channel controller is configured to divide the message into a set of sub-messages based on the SNR for each sub-channel; and the sub-channel controller is configured to match the sub-messages to the sub-channels to maximize throughput of the message data to the second near-field device.

In another example embodiment, the sub-channel controller is configured to divide the message into a set of sub-messages based on the SNR for each sub-channel; and the sub-channel controller is configured to initiate in parallel transmission of all the sub-messages on the different sub-channels.

In another example embodiment, the sub-channel controller is configured to, divide the message into a set of sub-messages; transmit a first one of the sub-messages on a first one of the sub-channels having a highest SNR at a first time; recalculate the SNR for each sub-channel; and transmit a second one of the sub-messages on a second one of the sub-channels having a highest SNR at a second time; and the first one of the sub-channels is different than the second one of the sub-channels.

In another example embodiment, the message is a first message; the sub-channel controller is configured to receive a second message to be transmitted to a third near-field device in the near-field body-network; and the sub-channel controller is configured to match the first message to a first one of the sub-channels and match the second message to a second one of the sub-channels.

In another example embodiment, the first message has a greater data size than the second message; the sub-channel controller is configured to select the first one of the sub-channels as having a highest SNR; and the sub-channel controller is configured to select the second one of the sub-channels as having an SNR lower than that of the first one of the sub-channel s.

In another example embodiment, the sub-channel controller is configured to select at least two sub-channels, from the set of sub-channels, for transmission of the message that have higher SNRs than other sub-channels in the set of sub-channels; and the sub-channel controller is configured to redundantly transmit the message on the at least two sub-channels.

In another example embodiment, the sub-channel controller is configured to divide the message into a set of sub-messages; and the sub-channel controller is configured to readjust the ratio, of the E-field generated by the near-field electric antenna and the H-field generated by the near-field magnetic antenna, more than once during transmission of the message.

In another example embodiment, each one of the sub-messages includes additional data indicating the ratio of the E-field to the H-field used for the each one of the sub-messages.

In another example embodiment, each one of the sub-messages includes additional data indicating a next ratio of the E-field to the H-field to be used for a next one of the sub-messages.

In another example embodiment, the multi-channel NFEMI device is embedded in a wearable device.

In another example embodiment, the wearable device is an earbud.

In another example embodiment, the SNR is affected by a set of device interference sources that are not part of the near-field body-network.

In another example embodiment, the SNR is affected by a set of additional near-field body-networks that are not part of the near-field body-network.

In another example embodiment, the sub-channel controller is configured to be coupled to a movement detector; and the sub-channel controller is configured to, calculate a frequency of movement based on signals from the movement detector; and calculate the SNR for all sub-channels at a frequency equal to or greater than the frequency of movement.

In another example embodiment, the multi-channel NFEMI device is configured to be worn by a person; the movement detector detects the person's movements; and the sub-channel controller is configured to calculate the SNR for all sub-channels at a frequency equal to or greater than a quickest possible movement by the person.

In another example embodiment, the near-field electric and magnetic antennas are configured to communicate using non-propagating quasi-static magnetic near-field signals and non-propagating quasi-static electric near-field signals.

In another example embodiment, the narrow-band near-field channel has a bandwidth of less than 1 MHz; and the sub-channels have a bandwidth of less than 2 KHz.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
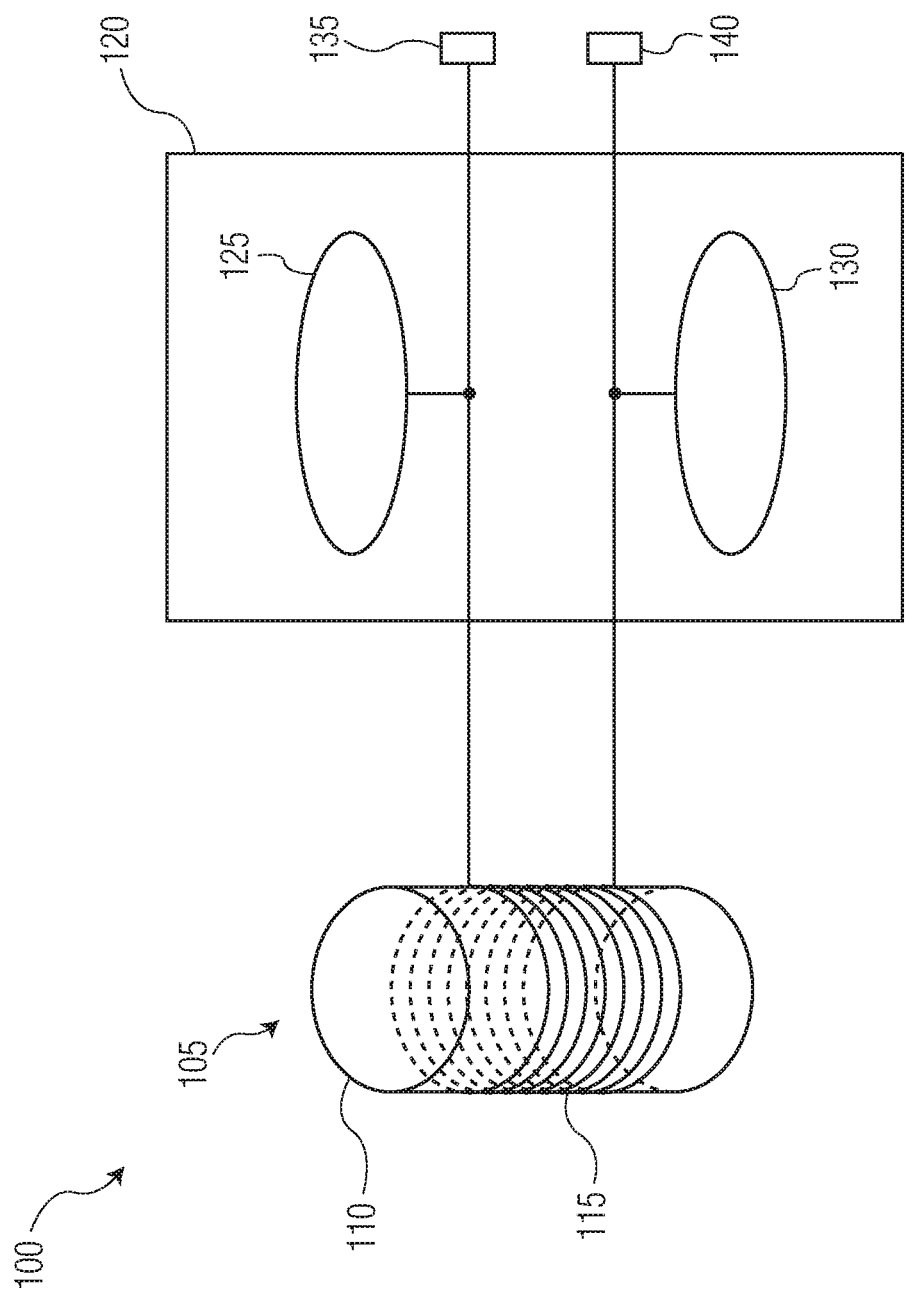
FIG. 1 is an example near-field electromagnetic induction (NFEMI) antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Near-field interactions between a near-field device based on near-field electromagnetic induction (NFEMI), where a transmitter and receiver are coupled by both magnetic (H) and electric (E) fields are herein discussed. In contrast to NFEMI communication that utilizes non-propagating quasi-static H and E fields, RF wireless communication is accomplished by propagating an RF plane wave through free space. Near-field devices can be configured to form a body-network, such as on a user's body, but can also form other body-networks with various conductive surfaces and/or other wireless networked devices (e.g. Internet of Things (IoT) devices).

A near-field magnetic (H) antenna is primarily sensitive to magnetic fields and/or primarily initiates magnetic fields when driven by a current. A small loop antenna is an example H-field antenna and includes a loop antenna with dimensions much smaller than the wavelength of its use. If the small loop antenna does not resonate at desired carrier frequency, it is tuned to resonance by an external reactance. In some example embodiments the current in the small loop antenna has in every position of the loop a same value.

A near-field electric (E) antenna is primarily sensitive to electric fields and/or primarily initiates electric fields when driven by a voltage. A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

FIG. 1 is an example near-field electromagnetic induction (NFEMI) antenna 100 for use in a wireless device. The antenna 100 in this example is an electromagnetic induction (NFEMI) antenna. In some example embodiments, the antenna 100 includes a magnetic (H-field) antenna 105 (e.g. small loop antenna) in conjunction with an electric (E-field) antenna 120 (e.g. short loaded dipole). The magnetic antenna 105 includes a ferrite core 110 wound with a wire coil 115. The electric (E-field) antenna 120 includes two loading plates 125 and 130. Antenna 100 feed points 135, 140 are coupled to various transceiver circuitry, such as downstream radio transmitter and receiver integrated circuit (RF-IC), (not shown here).

The electric (E-field) antenna 120 is responsive to an electric (E) field. The magnetic antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body-networked communications.

In various example embodiments, the antenna 100 operates at or below 50 MHz to ensure that the fields are following the body contours and to ensure that far field radiation is strongly reduced. The size of the magnetic antenna 105 and the transmit frequency are chosen to reduce any far field radiation that may be created by the magnetic antenna 105. For example, the size of the magnetic antenna 105 wire coil 115 can be 2 mm in diameter and 6 mm in length and the transmit frequency kept below 50 MHz.

Although near-field communication body-networks may achieve high energy efficiency while communicating in the vicinity of a user, a quality/robustness of communication may be impaired by real-time variations in the user's body posture and/or other spatial movements. Such body-network near-field antennas may also be particularly sensitive to different kinds of external signal interference as well as to other user's operating similar near-field body-networks. Two examples of such interference are now shown.

Figure 2B:
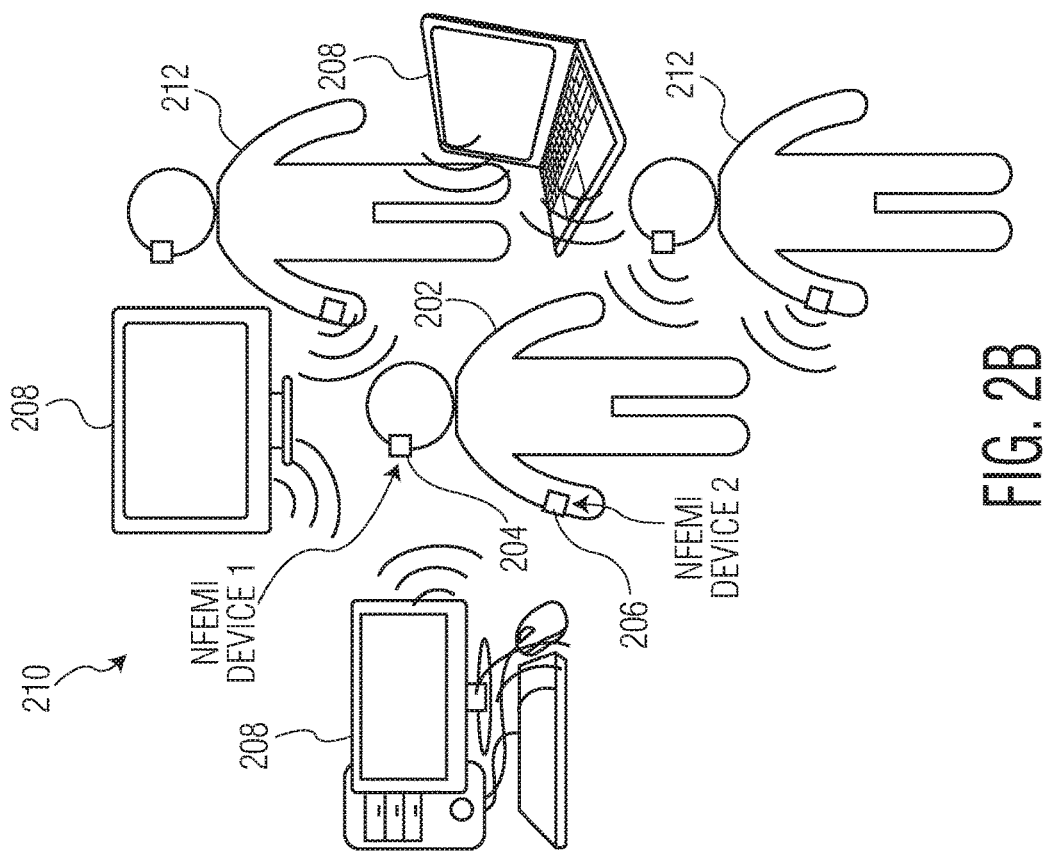
FIG. 2B is a second example illustration of nearby electronic interference.
Figure 2A:
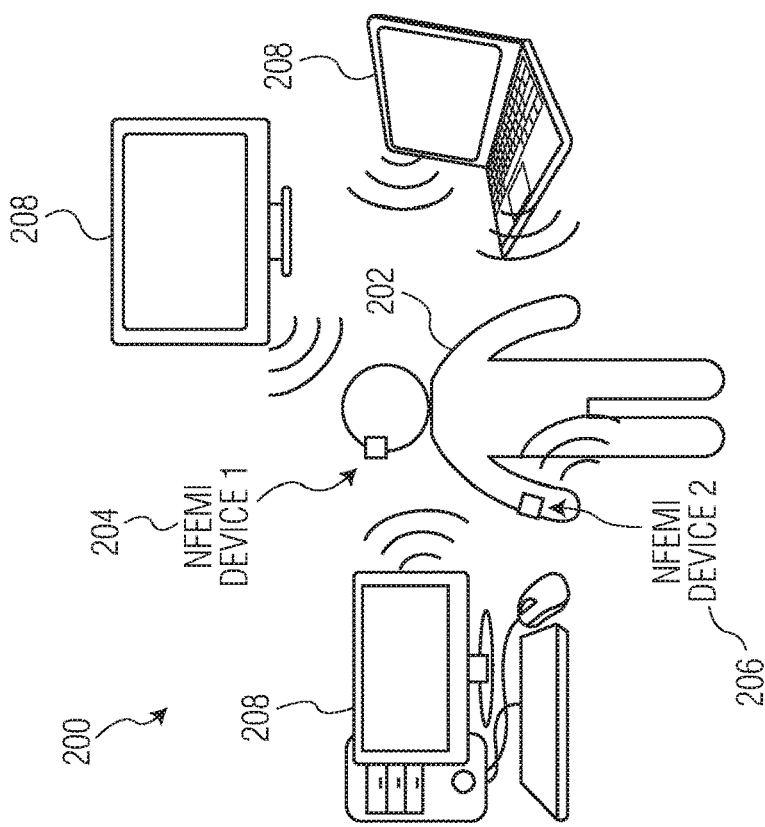
FIG. 2A is a first example illustration of nearby electronic interference.

FIG. 2A is a first example 200 illustration of nearby electronic interference. Shown is a user 202 wearing a first near-field device 204 (e.g. NFEMI) and a second near-field device 206. The two devices 204, 206 form a near-field body-network.

Nearby are several device interference sources 208 that generate electrical interference signals, that depending upon the user's 202 posture and movements with respect to the interference sources 208 can degrade and/or block communications between the first and second near-field device 204, 206. Just the user 202 typing text on one of the device interference sources 208 (e.g. a computer keyboard) can interfere with the user's 202 own near-field body-network between the user's 202 device 204, 206.

FIG. 2B is a second example 210 illustration of nearby electronic interference. Shown is the user 202 in an environment similar to the first example 200, but now with additional user interference sources 212 (i.e. other users having their own near-field body-networks).

Now discussed is a multi-channel near-field electromagnetic induction (NFEMI) device for reducing or eliminating interference between a user's own near-field communication body-network from various device interference sources and additional user interference sources in an environment.

The multi-channel near-field device leverages that a user's body (or other conductive surface) acts like an antenna for near-field electric induction (NFEI) signals but does not act like an antenna for near-field magnetic induction (NFMI) signals.

Thus given variable interference sources do not always or necessarily generate both electric and magnetic near-field interference within an entire near-field channel, the multi-channel near-field device senses any environmental interference signals and dynamically allocates, and reallocates, a near-field body-network's messages, or portions thereof, between different sub-channels, different near-fields (e.g. all E-field, all H-field, ratio of E/H fields), and/or different modulation protocols (e.g. BPSK, QPSK, etc.).

By adaptively loading the multiple sub-channels, adaptively changing the E/H near-field ratio, and/or varying a modulation protocol (e.g. BPSK, QPSK, etc.) more stable body-network near-field communication in cases of multiple other near-field users and/or interference from other electronic devices is possible.

The proposed near field communication method improves the reliability for wireless communication products in applications near a human body, and is well suited for body-networks in consumer life style and healthcare products.

Figure 3:
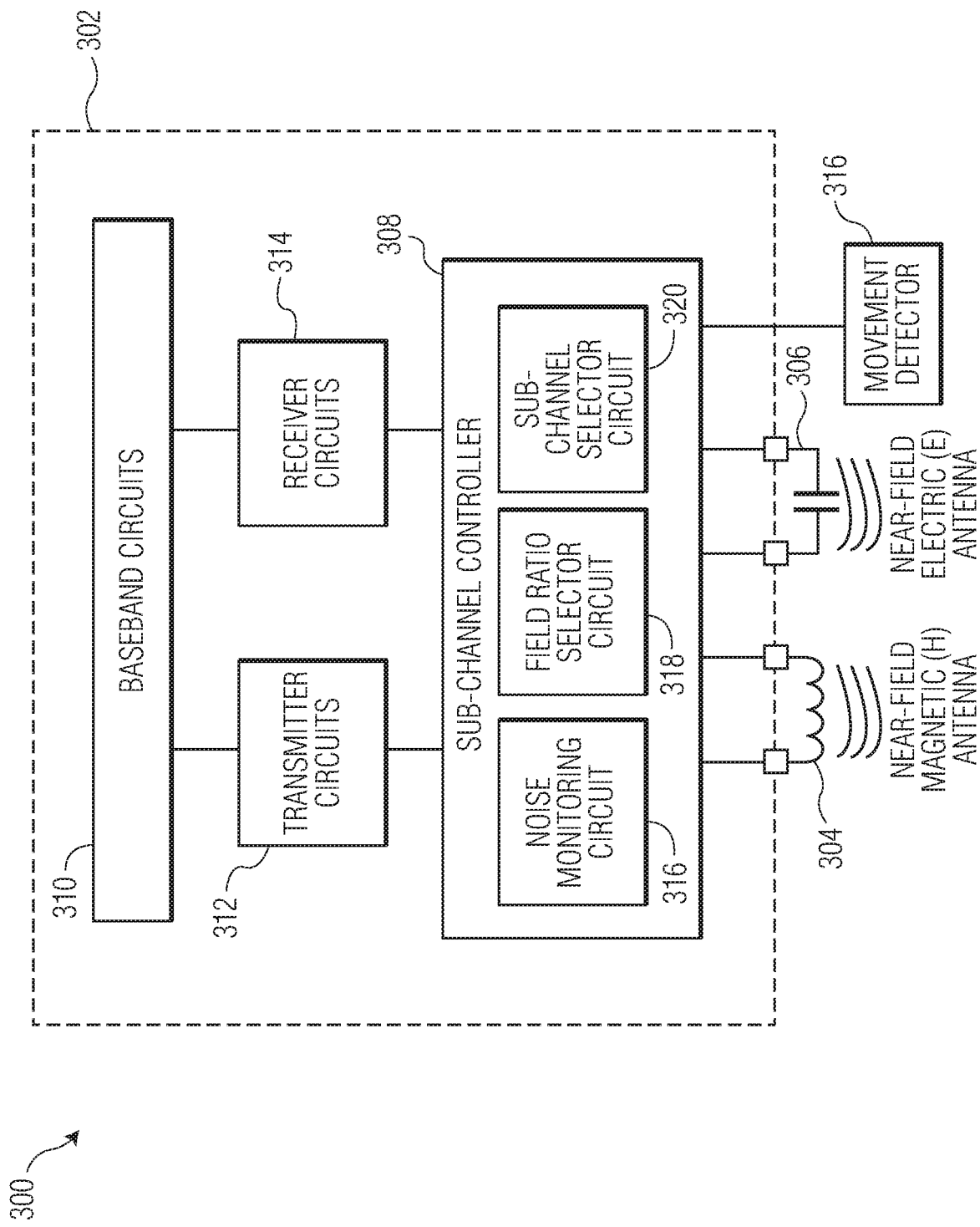
FIG. 3 is an example multi-channel near-field electromagnetic induction (NFEMI) device.

FIG. 3 is an example 300 multi-channel near-field electromagnetic induction (NFEMI) device 302. The multi-channel NFEMI device 302 is coupled to a near-field magnetic antenna 304 (H-field), a near-field electric antenna 306 (E-field), and a movement detector 322. The multi-channel NFEMI device 302 includes a sub-channel controller 308, baseband circuits 310, transmitter circuits 312, and receiver circuits 314. The sub-channel controller 308 includes a noise monitoring circuit 316, a field-ratio selector circuit 318, and a sub-channel selector circuit 320.

The sub-channel controller 308 receive a message from the baseband circuits 310 and transmitter circuits 312 to be transmitted to a second near-field device in a near-field body-network (see 204, 206 in FIGS. 2A and 2B) through the near-field electric and magnetic antennas 304, 306. The sub-channel controller 308 in conjunction with the sub-channel selector circuit 320 divides a narrow-band near-field channel into a set of sub-channels (see FIG. 4). The narrow-band near-field channel can have a bandwidth of less than 1 MHz, and the sub-channels can have a bandwidth of less than 2 KHz.

The sub-channel controller 308, from data/signals received from the noise monitoring circuit 316, calculates a signal-to-noise-ratio (SNR) for each sub-channel and uses the sub-channel selector circuit 320 to select a sub-channel, from the set of sub-channels, for transmission of the message. The selected sub-channel in some example embodiments has a higher SNR than another sub-channel in the set of sub-channels.

In some example embodiments, the sub-channel controller 308 using the field-ratio selector circuit 318 adjusts a ratio of an E-field generated by the near-field electric antenna and an H-field generated by the near-field magnetic antenna, for transmission of the message to the second near-field device, based on the SNR. The sub-channel controller 308 can additionally select a modulation protocol for transmission of the message to the second near-field device, based on the SNR.

In some example embodiments the sub-channel controller 308 selects a sub-channel, from the set of sub-channels, for transmission of the message that has a highest SNR than any other sub-channel in the set of sub-channels.

In some example embodiments the sub-channel controller 308 divides the message into a set of sub-messages, and the sub-channel controller 308 transmits all the sub-messages serially on the sub-channel having the highest SNR.

In other example embodiments the sub-channel controller 308 divides the message into a set of sub-messages based on the SNR for each sub-channel, and the sub-channel controller 308 matches the sub-messages to the sub-channels such that the second near-field device receives all the sub-messages at substantially a same time.

Embodiments of the sub-channel controller 308 can also divide the message into a set of sub-messages based on the SNR for each sub-channel, and the sub-channel controller 308 matches the sub-messages to the sub-channels to maximize throughput of the message data to the second near-field device.

In still other example embodiments the sub-channel controller 308 divides the message into a set of sub-messages based on the SNR for each sub-channel, and the sub-channel controller 308 initiates in parallel transmission of all the sub-messages on the different sub-channels.

The sub-channel controller 308 can be also configured to, divide the message into a set of sub-messages; transmit a first one of the sub-messages on a first one of the sub-channels having a highest SNR at a first time; recalculate the SNR for each sub-channel; and then transmit a second one of the sub-messages on a second one of the sub-channels having a highest SNR at a second time, where the first one of the sub-channels is different than the second one of the sub-channels.

In some example embodiments the message is a first message and the sub-channel controller 308 receives a second message to be transmitted to a third near-field device in the near-field body-network. The sub-channel controller 308 then matches the first message to a first one of the sub-channels and match the second message to a second one of the sub-channels.

In some example embodiments the first message has a greater data size than the second message and the sub-channel controller 308 selects the first one of the sub-channels as having a highest SNR. The sub-channel controller 308 then selects the second one of the sub-channels as having an SNR lower than that of the first one of the sub-channels.

The sub-channel controller 308 can also be configured to select at least two sub-channels, from the set of sub-channels, for transmission of the message that have higher SNRs than other sub-channels in the set of sub-channels, and then the sub-channel controller 308 redundantly transmits the message on the at least two sub-channels.

In some example embodiments the sub-channel controller 308 divides the message into a set of sub-messages, and the sub-channel controller 308 then readjusts the ratio, of the E-field generated by the near-field electric antenna 306 and the H-field generated by the near-field magnetic antenna 304, more than once during transmission of the message. Each one or just some of the sub-messages can include additional data indicating the ratio of the E-field to the H-field used for the each one of the sub-messages. In some example embodiments each one of the sub-messages includes additional data indicating a next ratio of the E-field to the H-field to be used for a next one of the sub-messages.

The multi-channel NFEMI device 302 can be embedded in a wearable device such as an earbud, a smartwatch, a smartphone, a medical device, etc.

As introduced above, the SNR can be affected by a set of device interference sources that are not part of the near-field body-network, as well as by a set of additional near-field body-networks that are not part of the near-field body-network. The noise signal interference from devices can include a variable combination of E-field and/or H-field noise interference. By changing the E/H field ratio, the sub-channel controller 308, using the field-ratio selector circuit 318, can reduce the interference when messages, or parts thereof, are transmitted. If changing the E/H field ratio is not sufficient for reliable/robust near-field body-network communications, then the sub-channel controller 308 can also change the modulation to lower a number of bits per symbol to enhance the throughput on various channels using the sub-channel selector circuit 320.

In some example embodiments the sub-channel controller 308 is coupled to a movement detector 322. The sub-channel controller 308 is then configured to, calculate a frequency of movement based on signals from the movement detector 322, and then calculate the SNR for all sub-channels at a frequency equal to or greater than the frequency of movement. In those example embodiments where the multi-channel NFEMI device is worn by a person, the movement detector 322 detects the person's movements; and the sub-channel controller 308 calculates the SNR for all sub-channels at a frequency equal to or greater than a quickest possible movement by the person.

Thus in many example embodiments the sub-channel controller 308 dynamically allocates, and reallocates, a near-field body-network's messages, or portions thereof, between different sub-channels, different near-fields (e.g. all E-field, all H-field, ratio of E/H fields), and/or different modulation protocols (e.g. BPSK, QPSK, etc.) to maximize a data throughput of the overall narrowband near-field channel 302.

On channels with high signal to noise ratio and little or no interference, a modulation method that increases the number of bits per symbol that can be expressed can be used. An example modulation method is quadrature phase shift keying (QPSK), the phase of a carrier is divided into four states and the number of bits per symbol is doubled compared to for example BPSK. Also quadrature amplitude modulation (QAM) may be used in order to even further increase the number of bits per symbol.

Figure 4:
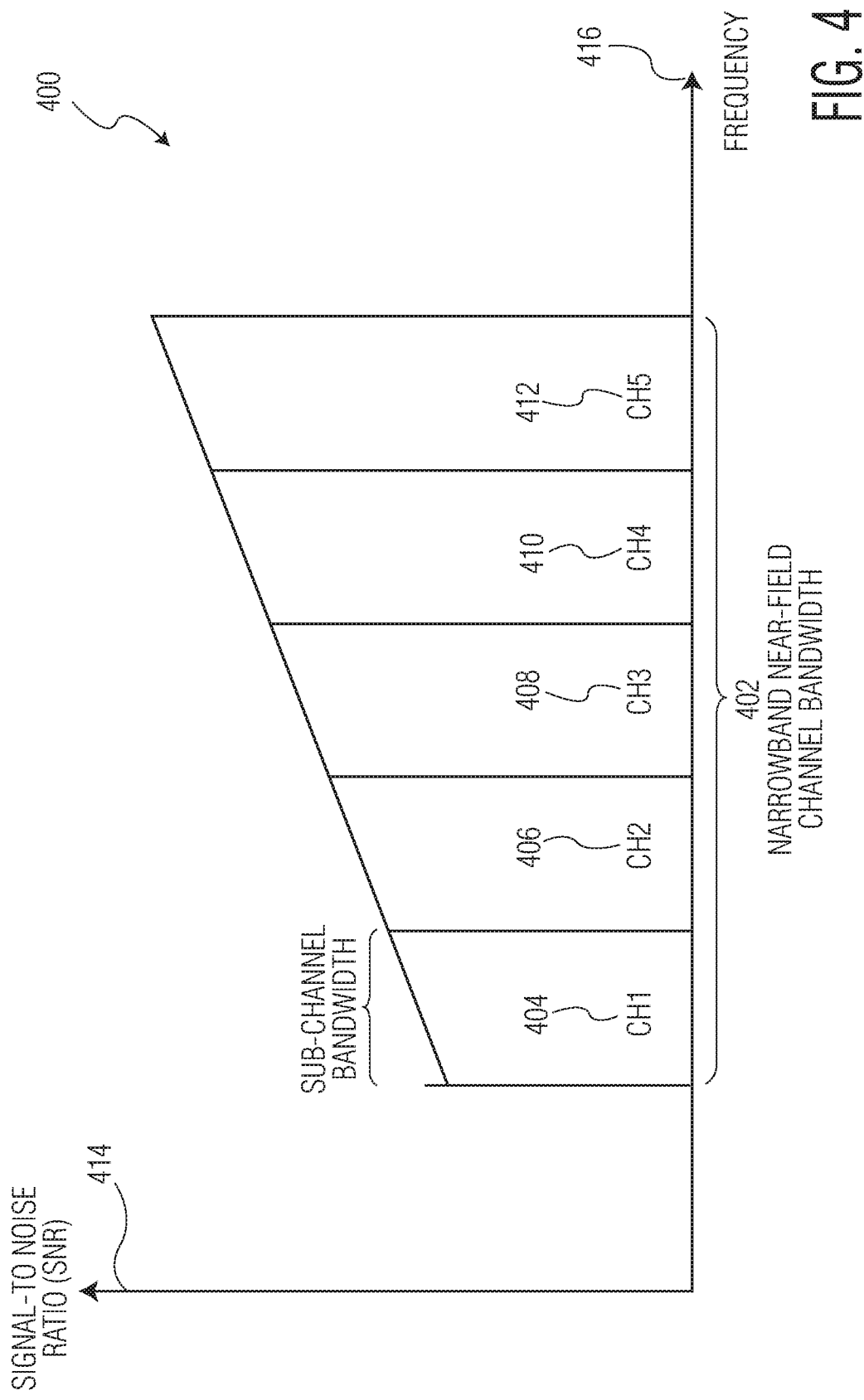
FIG. 4 is an example graph of a narrowband near-field channel divided into a set of sub-channels.

FIG. 4 is an example 400 graph of a narrowband near-field channel 402 divided into a set of sub-channels 404, 406, 408, 410, 412. In this example 400 the fifth sub-channel 412 has a highest SNR within the overall channel 402 and the first sub-channel 404 has a lowest SNR within the overall channel 402.

If the noise monitoring circuit 316 indicates that this SNR variation is primarily dependent upon the E/H field ratio, then the sub-channel controller 308 can command the field-ratio selector circuit 318 to vary the E/H field ratio for the first sub-channel 404 having the lowest SNR and thereby improve the SNR for the first sub-channel 404.

Since the SNR for the fifth sub-channel 412 is already high, then the sub-channel controller 308 can command the field-ratio selector circuit 318 to keep the E/H field ratio for the fifth sub-channel 412 the same. Similarly, if the noise monitoring circuit 316 indicates that this SNR variation is primarily dependent upon the sub-channel, then the sub-channel controller 308 can command the sub-channel selector circuit 320 to route message data to only those sub-channels not experiencing a predetermined level of SNR degradation.

Given a particular set of sub-channels and E/H ratios to be used, the sub-channel controller 308 can then apply a modulation scheme (e.g. BPSK, QPSK, 8-QAM, etc.) to maximize data throughput for a given sub-channel's SNR. Thus for sub-channels having a higher SNR, the sub-channel controller 308 can increase the bit-loading, such that the fifth sub-channel 412 has a highest bitrate/bit-loading (e.g. perhaps by using 8-QAM modulation). For sub-channels having a lower SNR, the sub-channel controller 308 can decrease the bit-loading, such that the first sub-channel 404 has a lowest bitrate/bit-loading (e.g. perhaps by using BPSK modulation). So while even though the first sub-channel 404 will have less throughput then the fifth sub-channel 412, the overall near-field channel's 402 throughput will be maximized.

Figure 5:
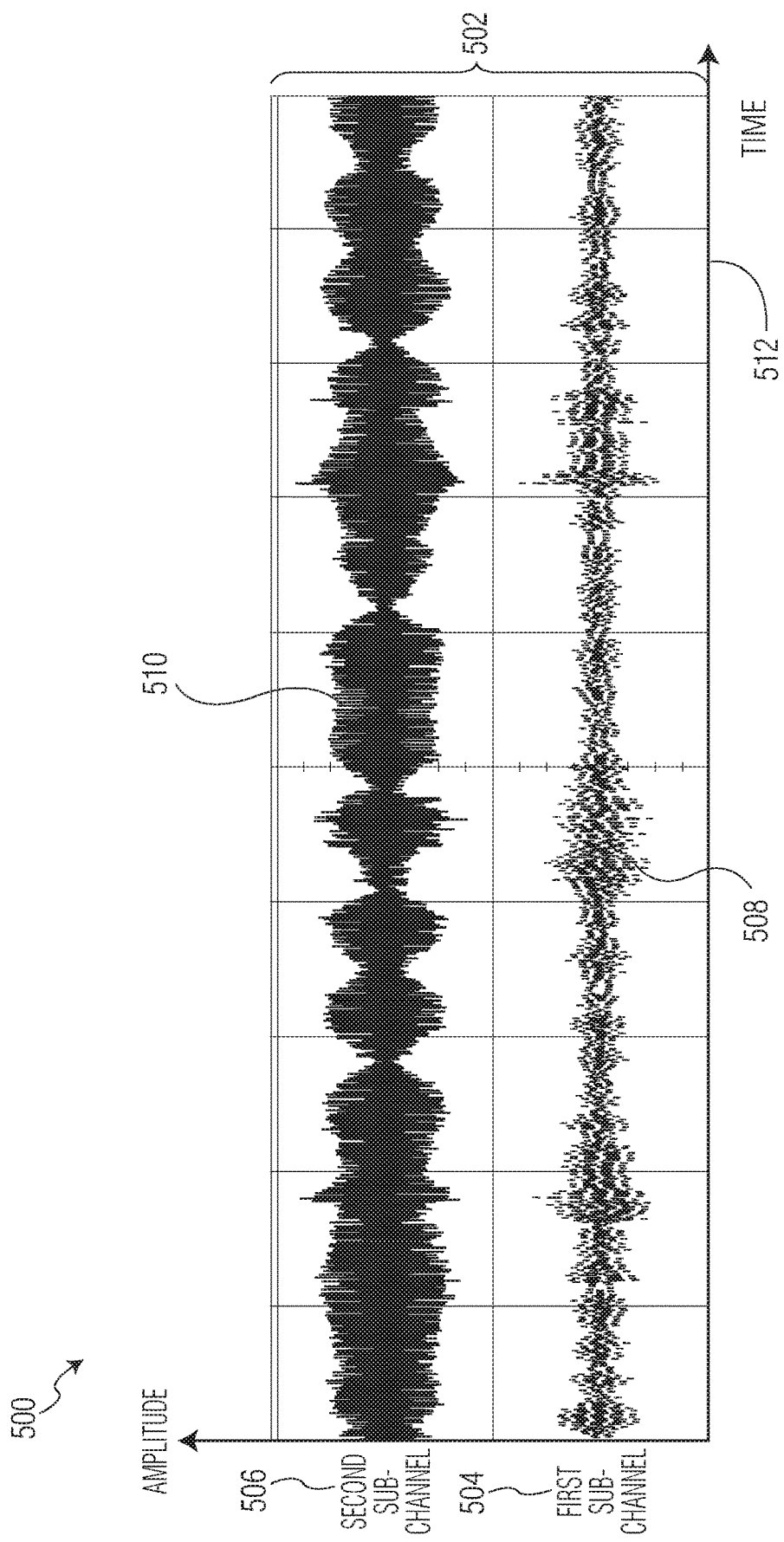
FIG. 5 is an example graph of an effect of noise signal interference on a user's near-field body-network.

FIG. 5 is an example 500 graph of an effect of noise signal interference on a user's near-field body-network. The example 500 shows a narrowband near-field channel 502 divided into a first sub-channel 504, and a second sub-channel 506. In this example, the overall near-field channel 502 is centered at about 10.6 MHz and has a bandwidth of about 1 MHz. The first and second sub-channels 504, 506 each have a bandwidth of about 200 KHz, respectively centered about 10.1 MHz and 10.5 MHz.

Over time 512, the first sub-channel 504 is experiencing a first noise amplitude 508 and a second noise amplitude 510. In this example, the noise signal interference is from a personal-computer screen, causing more interference on the second sub-channel 506 than the first sub-channel 504.

As discussed above, the sub-channel controller 308 dynamically allocates, and reallocates, the near-field body-network's messages, or portions thereof, between different sub-channels, different near-fields (e.g. all E-field, all H-field, ratio of E/H fields), and/or different modulation protocols (e.g. BPSK, QPSK, etc.) to maximize a throughput of the overall narrowband near-field channel 502.

Figure 6:
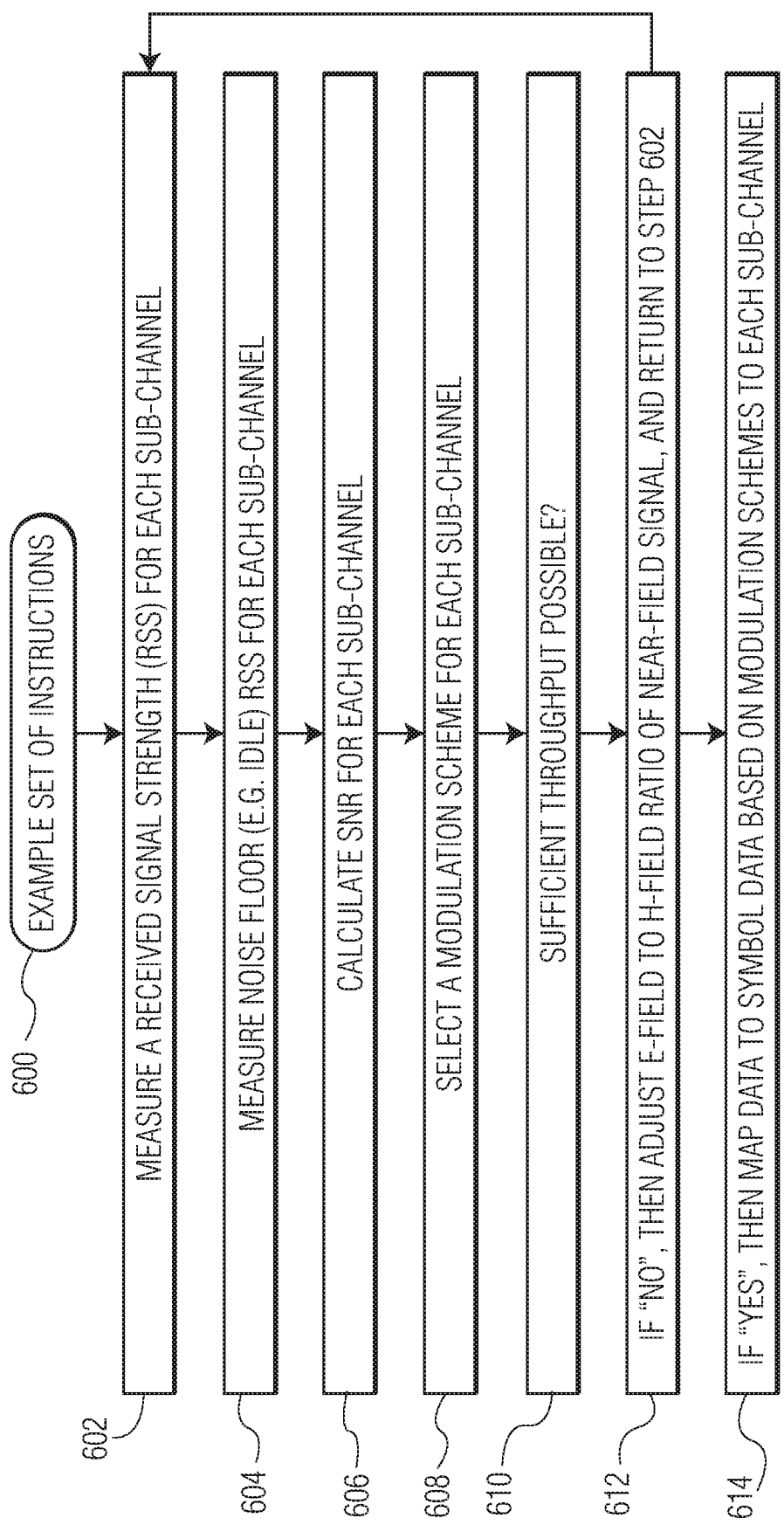
FIG. 6 is an example set of instructions for enabling a multi-channel near-field electromagnetic induction (NFEMI) device.

FIG. 6 is an example 600 set of instructions for enabling a multi-channel near-field electromagnetic induction (NFEMI) device 302. The order in which the instructions are discussed does not limit the order in which other example embodiments implement the instructions unless otherwise specifically stated. Additionally, in some embodiments the instructions are implemented concurrently.

A first example instruction set begins in 602, by measuring a Received Signal Strength (RSS) for each sub-channel. Next, in 604, measuring a noise floor (e.g. sub-channel in an idle state) for each sub-channel. This is done during an idle slot in the data frame of the communication protocol. Then in 606, calculating a Signal-to-Noise Ratio (SNR) for each sub-channel. Next in step 608, selecting a modulation scheme for each sub-channel.

Then in step 610, check if sufficient message/data throughput is possible. Next in step 612, if "No" (i.e. sufficient throughput is not possible), then adjust E-Field to H-Field ratio of near-field signal, and return to Step 602. In step 614, if "Yes" (i.e. sufficient throughput is possible), then map message data to symbol data based on the modulation schemes to each sub-channel and transmit the message.

Various circuits and devices, such as the sub-channel controller 308, can host these instructions. Such systems can include an input/output data interface, a processor, a storage device, and a non-transitory machine-readable storage medium. The machine-readable storage medium includes the instructions which control how the processor receives input data and transforms the input data into output data, using data within the storage device. The machine-readable storage medium in an alternate example embodiment is a non-transitory computer-readable storage medium. In other example embodiments the set of instructions described above can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A multi-channel near-field electromagnetic induction (NFEMI) device, comprising:
   a sub-channel controller configured to be coupled to a near-field magnetic antenna (H-field) and a near-field electric antenna (E-field) and configured to receive a message to be transmitted to a second near-field device in a near-field body-network through the near-field electric and magnetic antennas;
   wherein the sub-channel controller is configured to divide a narrow-band near-field channel into a set of sub-channels;
   wherein the sub-channel controller is configured to calculate a signal-to-noise-ratio (SNR) for each sub-channel and select a sub-channel, from the set of sub-channels, for transmission of the message that has a higher SNR than another sub-channel in the set of sub-channels; and
   wherein the near-field electric and magnetic antennas are configured to communicate using non-propagating quasi-static magnetic near-field signals and non-propagating quasi-static electric near-field signals.

2. The device of claim 1:
   wherein the sub-channel controller is configured to adjust a ratio of an E-field generated by the near-field electric antenna and an H-field generated by the near-field magnetic antenna, for transmission of the message to the second near-field device, based on the SNR.

3. The device of claim 2:
   wherein the sub-channel controller is configured to select a modulation protocol for transmission of the message to the second near-field device, based on the SNR.

4. The device of claim 2:
wherein the sub-channel controller is configured to divide the message into a set of sub-messages;
wherein the sub-channel controller includes a field-ratio selector circuit; and
wherein the field-ratio selector circuit is configured to readjust the ratio, of the E-field generated by the near-field electric antenna and the H-field generated by the near-field magnetic antenna, more than once during transmission of the message.

5. The device of claim 4:
wherein each one of the sub-messages includes additional data indicating the ratio of the E-field to the H-field used for the each one of the sub-messages.

6. The device of claim 4:
wherein each one of the sub-messages includes additional data indicating a next ratio of the E-field to the H-field to be used for a next one of the sub-messages.

7. The device of claim 1:
wherein the sub-channel controller is configured to select a sub-channel, from the set of sub-channels, for transmission of the message that has a highest SNR than any other sub-channel in the set of sub-channels.

8. The device of claim 7:
wherein the sub-channel controller is configured to divide the message into a set of sub-messages; and
wherein the sub-channel controller is configured to transmit all the sub-messages serially on the sub-channel having the highest SNR.

9. The device of claim 1:
wherein the sub-channel controller is configured to divide the message into a set of sub-messages based on the SNR for each sub-channel; and
wherein the sub-channel controller is configured to match the sub-messages to the sub-channels such that the second near-field device receives all the sub-messages at substantially a same time.

10. The device of claim 1:
wherein the sub-channel controller is configured to divide the message into a set of sub-messages based on the SNR for each sub-channel; and
wherein the sub-channel controller is configured to match the sub-messages to the sub-channels to maximize throughput of the message data to the second near-field device.

11. The device of claim 1:
wherein the sub-channel controller is configured to divide the message into a set of sub-messages based on the SNR for each sub-channel; and
wherein the sub-channel controller is configured to initiate in parallel transmission of all the sub-messages on the different sub-channels.

12. The device of claim 1:
wherein the sub-channel controller is configured to,
divide the message into a set of sub-messages;
transmit a first one of the sub-messages on a first one of the sub-channels having a highest SNR at a first time;
recalculate the SNR for each sub-channel; and
transmit a second one of the sub-messages on a second one of the sub-channels having a highest SNR at a second time; and
wherein the first one of the sub-channels is different than the second one of the sub-channels.

13. The device of claim 1:
wherein the message is a first message;
wherein the sub-channel controller is configured to receive a second message to be transmitted to a third near-field device in the near-field body-network; and
wherein the sub-channel controller is configured to match the first message to a first one of the sub-channels and match the second message to a second one of the sub-channels.

14. The device of claim 13:
wherein the first message has a greater data size than the second message;
wherein the sub-channel controller is configured to select the first one of the sub-channels as having a highest SNR; and
wherein the sub-channel controller is configured to select the second one of the sub-channels as having an SNR lower than that of the first one of the sub-channels.

15. The device of claim 1:
wherein the sub-channel controller is configured to select at least two sub-channels, from the set of sub-channels, for transmission of the message that have higher SNRs than other sub-channels in the set of sub-channels; and
wherein the sub-channel controller is configured to redundantly transmit the message on the at least two sub-channels.

16. The device of claim 1:
wherein the multi-channel NFEMI device is embedded in a wearable device.

17. The device of claim 16:
wherein the wearable device is an earbud.

18. The device of claim 1:
wherein the SNR is affected by a set of device interference sources that are not part of the near-field body-network.

19. The device of claim 1:
wherein the SNR is affected by a set of additional near-field body-networks that are not part of the near-field body-network.

20. The device of claim 1:
wherein the sub-channel controller is configured to be coupled to a movement detector; and
wherein the sub-channel controller is configured to,
calculate a frequency of movement based on signals from the movement detector; and
calculate the SNR for all sub-channels at a frequency equal to or greater than the frequency of movement.

21. The device of claim 20:
wherein the multi-channel NFEMI device is configured to be worn by a person;
wherein the movement detector detects the person's movements; and
wherein the sub-channel controller is configured to calculate the SNR for all sub-channels at a frequency equal to or greater than a quickest possible movement by the person.

22. The device of claim 20:
wherein the narrow-band near-field channel has a bandwidth of less than 1 MHz; and
wherein the sub-channels have a bandwidth of less than 2 KHz.

23. A multi-channel near-field electromagnetic induction (NFEMI) device, comprising:
a sub-channel controller configured to be coupled to a near-field magnetic antenna (H-field) and a near-field electric antenna (E-field) and configured to receive a message to be transmitted to a second near-field device in a near-field body-network through the near-field electric and magnetic antennas;

wherein the sub-channel controller is configured to divide a narrow-band near-field channel into a set of sub-channels;

wherein the sub-channel controller is configured to calculate a signal-to-noise-ratio (SNR) for each sub-channel and select a sub-channel, from the set of sub-channels, for transmission of the message that has a higher SNR than another sub-channel in the set of sub-channels;

wherein the message is a first message;

wherein the sub-channel controller is configured to receive a second message to be transmitted to a third near-field device in the near-field body-network; and wherein the sub-channel controller is configured to match the first message to a first one of the sub-channels and match the second message to a second one of the sub-channels.

24. A multi-channel near-field electromagnetic induction (NFEMI) device, comprising:

a sub-channel controller configured to be coupled to a near-field magnetic antenna (H-field) and a near-field electric antenna (E-field) and configured to receive a message to be transmitted to a second near-field device in a near-field body-network through the near-field electric and magnetic antennas;

wherein the sub-channel controller is configured to divide a narrow-band near-field channel into a set of sub-channels;

wherein the sub-channel controller is configured to calculate a signal-to-noise-ratio (SNR) for each sub-channel and select a sub-channel, from the set of sub-channels, for transmission of the message that has a higher SNR than another sub-channel in the set of sub-channels;

wherein the sub-channel controller is configured to select at least two sub-channels, from the set of sub-channels, for transmission of the message that have higher SNRs than other sub-channels in the set of sub-channels; and wherein the sub-channel controller is configured to redundantly transmit the message on the at least two sub-channels.

* * * * *